N. REEVES.
CAR COUPLING.
No. 63,940.
Patented Apr. 16, 1867.
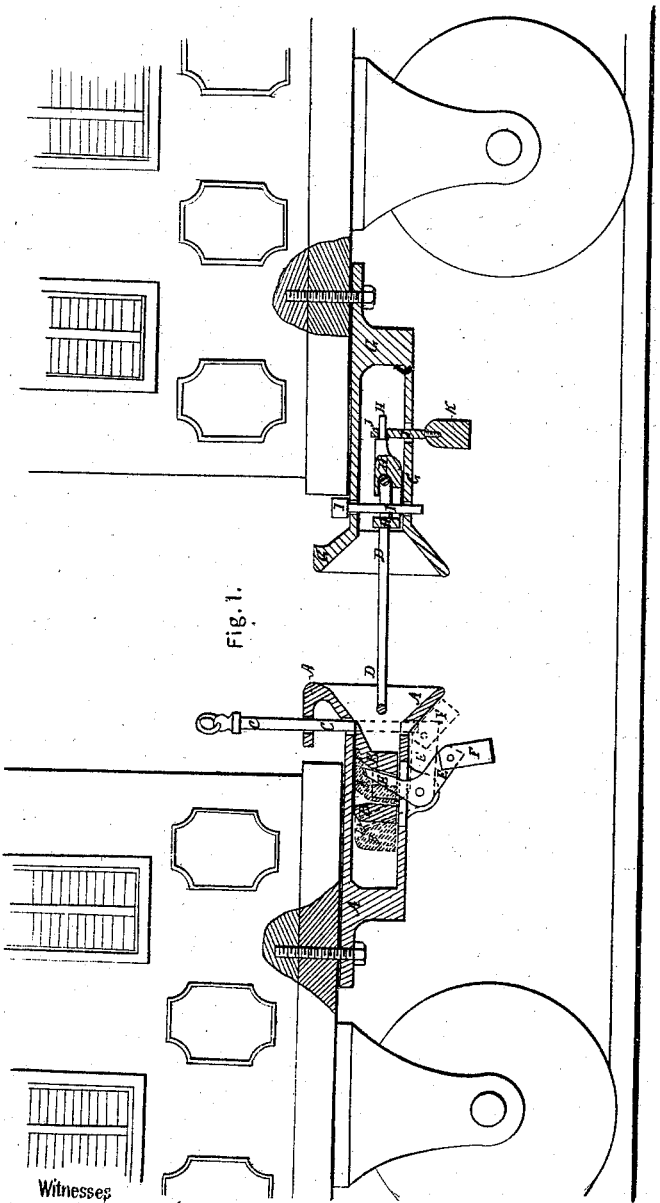
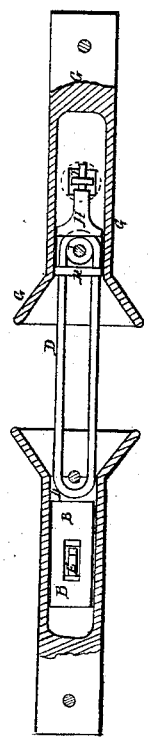
Witnesses
Alex F. Roberts
Wm Trevin
Inventor
Narcisse Reeves
per Munn & Co
Attorneys

United States Patent Office.

NARCISSE REEVES, OF DU QUOIN, ILLINOIS.

Letters Patent No. 63,940, dated April 16, 1867.

IMPROVED CAR-COUPLING.

*The Schedule referred to in these Letters Patent and making part of the same.*

---

TO ALL WHOM IT MAY CONCERN:

Be it known that I, NARCISSE REEVES, of Du Quoin, in the county of Perry, and State of Illinois, have invented a new and useful improvement in Car-Coupling; and I do hereby declare that the following is a full, clear, and exact description thereof, which will enable others skilled in the art to make and use the same, reference being had to the accompanying drawings, forming part of this specification, in which—

Figure 1 is a side view of my improved coupling uncoupled, parts being broken away to show the construction.

Figure 2 is a top view of the same coupled, parts being broken away to show the construction.

Similar letters of reference indicate like parts.

My invention has for its object to furnish an improved coupling for railroad cars which shall be self-coupling, and at the same time simple and strong in construction and reliable in operation; and it consists in the combination of a weighted bent lever and a sliding block with one bumper of the car, and in the combination of a weighted arm and sliding block with the coupling link and with the other bumper of the car, the whole being constructed and arranged as hereinafter more fully described.

A is a bumper, which may be attached to the end of the car in the ordinary manner, the cavity that receives the link being lengthened, as shown in figs. 1 and 2. B is a solid metal block that fits into and slides back and forth in the cavity of the bumper A, as shown in figs. 1 and 2. The upper part of the forward end of the block B projects forward, as shown in fig. 1, so that when drawn forward it may support the coupling pin C, as shown, and leave space for the link D to enter the bumper sufficiently far to be coupled before causing the pin to drop. The block B has a hole formed in or through it for the reception of the upper end of the bent lever E, the lower end of which hole is enlarged to allow the upper end of the said lever sufficient play as the block B moves back and forward. E is the bent lever, which is pivoted to ears projecting downward from the lower side of the bumper A, as shown in fig. 1. The upper end of the lever E passes up through a slot in the said lower side of the bumper, and enters the hole in the block B before described. The lower end of the lever E projects forward beneath the bumper, and has a weight, F, securely attached to it. The weight F must be sufficient to draw the block B forward whenever released by the withdrawal of the pin C. When the cars are uncoupled the lever E, block B, and pin C are in the positions shown in black lines in fig. 1. As the cars come together the end of the link D enters the bumper A, strikes the forward end of the block B, pushes it back, and allows the pin C to drop through the link D securely coupling the cars, the lever block and pin then being in the position shown in red in fig. 1. G is the adjacent bumper of the next car, or the bumper at the other end of the same car, the cavity of which is lengthened, as shown in figs. 1 and 2. H is a movable or sliding block, having a hole formed through it for the passage of the pin I. It is also made with notches or grooves so that it may be attached or hooked to the link D in such a position that the pin I may pass through the block H and link D at the same time, and in such a way that raising or lowering the inner end of the block H will lower or raise the projecting end of the link, and when the block H is in a horizontal position the link will also be held in a horizontal position. The inner end of the block H is made small, and is rounded off, as shown in the drawings, so as to enter and work in a hole formed in the upper end of the arm J. The arm J passes down through a hole in the under side of the bumper G, and to its lower end is attached a weight, K, sufficiently large to balance the projecting end of the link D and hold it in a horizontal position, so that when the cars come together it will be impossible for the link D to fail to enter the mouth of the bumper A and couple the cars.

What I claim as new, and desire to secure by Letters Patent, is—

The combination of the sliding block H and weighted arm J with the link D and bumper G, substantially as herein shown and described and for the purpose set forth.

NARCISSE REEVES.

Witnesses:
M. B. LAWRENCE,
I. M. STAGG.